May 19, 1964 R. H. RILEY, JR., ETAL 3,133,450
TWO-SPEED TRANSMISSION FOR PORTABLE ELECTRIC TOOL
Filed Aug. 30, 1962 2 Sheets-Sheet 1

INVENTOR
ROBERT H. RILEY, JR.
DANIEL M. ELLIGSON

BY *Leonard Bloom*

ATTORNEY

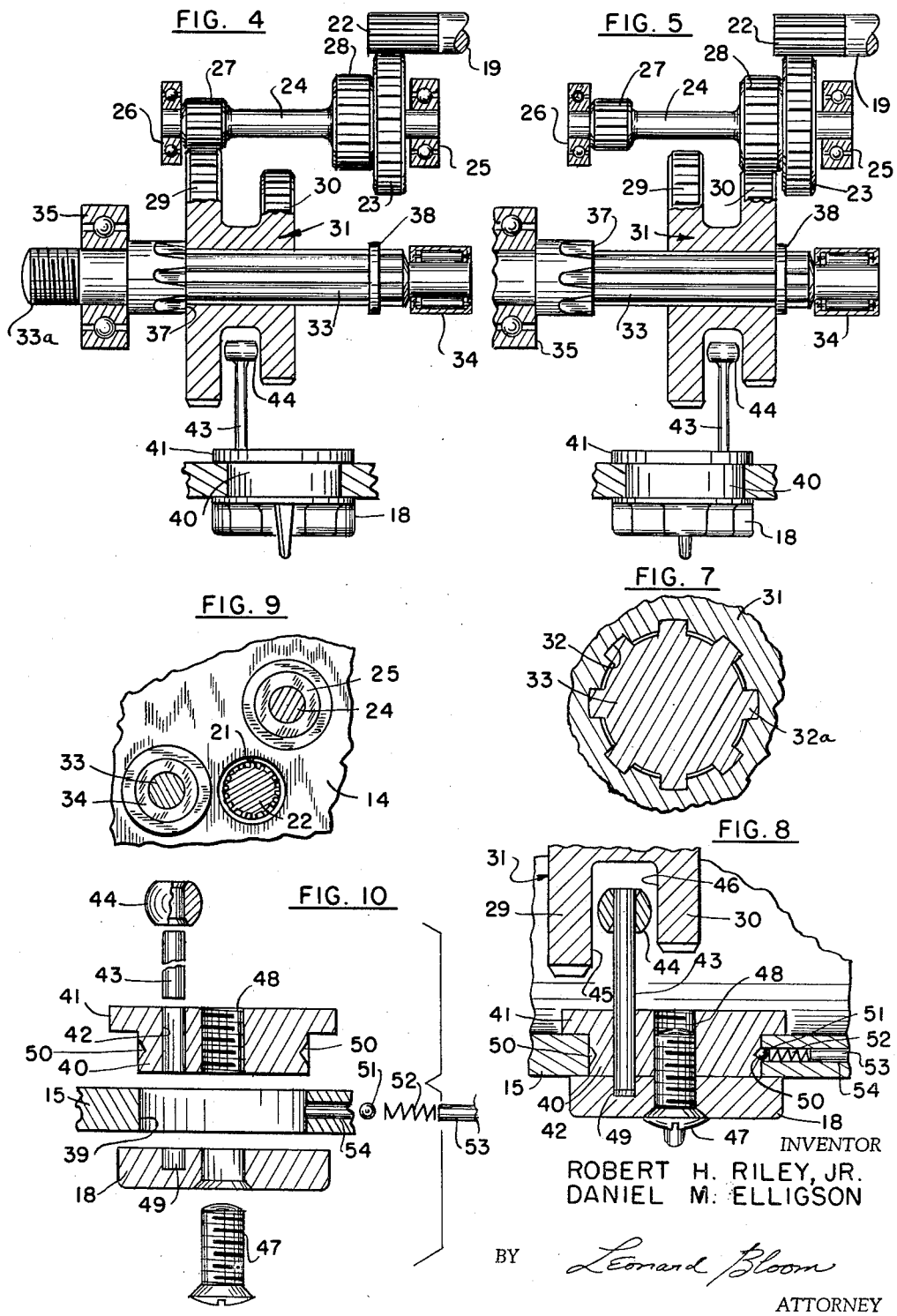

United States Patent Office 3,133,450
Patented May 19, 1964

3,133,450
TWO-SPEED TRANSMISSION FOR PORTABLE
ELECTRIC TOOL
Robert H. Riley, Jr., Towson, and Daniel M. Elligson,
Baltimore, Md., assignors to The Black and Decker
Manufacturing Company, Towson, Md., a corporation
of Maryland
Filed Aug. 30, 1962, Ser. No. 220,379
1 Claim. (Cl. 74—342)

*Introduction*

The present invention relates to a two-speed transmission for a portable electric tool, and more particularly, to such a transmission which is compact, easy to shift, economical to manufacture and to assemble, and durable and reliable for long trouble-free performance.

*The Prior Art*

In the prior art, of which we are aware, two-speed transmissions for portable electric tools have been designed or manufactured, wherein an axially-slidable gear cluster, or else a clutch element, is keyed or splined to the output spindle, such that the movement of the gear cluster axially along the spindle from one position to another will cause one or the other of a pair of different-sized gears (or pinions) to be engaged, thereby shifting the rotating speed of the output spindle from a "high" speed to a "low" speed, and vice versa. Various means have then been provided for accommodating a manual manipulation of the axially-slidable gear cluster. Such means may take the form of a bifurcated shifter fork that embraces the gear cluster or axially-slidable clutch element, and that has a portion thereof externally accessible for a manipulation by the user; one such shifted fork is illustrated and described in the Riley et al. Patent 2,942,490, issued on June 28, 1960, and assigned to the same assignee as that of the present invention. Another means for axially shifting a slidable gear cluster is illustrated in the now-expired Kollock Patent 1,581,927, wherein a shifter shaft, having an axis transverse to the spindle axis, carries an eccentric member which engages within a flanged sleeve secured adjacent to the gear cluster; and accordingly, rotation of the shifter shaft through an angle allows the gear cluster, via the eccentric member and flanged sleeve, to be shifted axially along the spindle from one position to another. The prior art structures of which the above-noted Kollock patent is indicative, have certain inherent limitations, among which are: (1) the increased length for the overall tool assembly; (2) the manufacturing cost and complexity; (3) the difficulty in manually switching from one position to another; and (4) the breakage and servicing problems experienced in continuous usage under heavy-duty conditions.

*Objects of the Present Invention*

Accordingly, it is an object of the present invention to alleviate these deficiencies by providing a two-speed transmission suitable for use in conjunction with a portable power-driven tool, wherein space and weight are at a premium, and wherein reliability, durability, and ease of operation are critical factors.

In accordance with the teachings of the present invention, there is provided a two-speed transmission having an axially-slidable gear cluster, comprising a pair of spaced-apart parallel gears of different size, coupled to the output spindle for rotation in unison. The gears are adapted to engage respective pinions formed upon an intermediate shaft, the latter being driven from the armature pinion by means of an intermediate gear. A rotatable member, having an axis transverse to the axis of the output spindle, is carried by the housing; and externally-accessible manually-manipulatable means are provided to shift the rotatable member from one position to another. An eccentric member is carried by the rotatable member, and a roller is secured on the end of the eccentric member. The roller is disposed intermediately of the gear cluster, that is to say, between the inner parallel faces of the gears forming the gear cluster. Consequently, the rotatable member may be rotated through an angle to cause the roller on the eccentric member to engage one or the other of the gears, thereby axially sliding the gear cluster along the output spindle to shift from one speed to another. Preferably, the roller has an axial clearance with respect to the inner parallel faces of the gears forming the axially-slidable gear cluster, so that the problems of wear and consequent breakage are alleviated.

*General Description of the Drawings*

These and other objects of the present invention will become apparent from a reading of the following specification, taken in conjunction with the enclosed drawings, in which.

Figure 1:
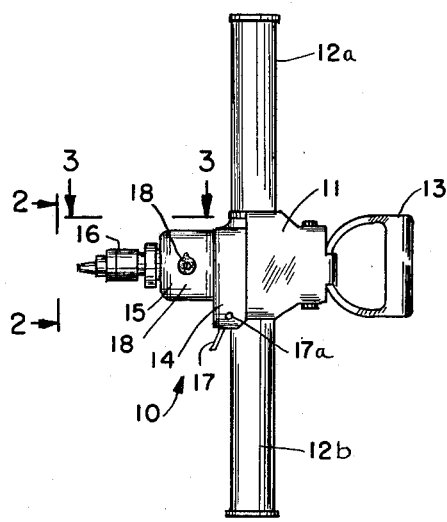
FIGURE 1 is a side elevational view of a typical portable electric tool to which the teachings of the present invention may be applied.
Figure 2:
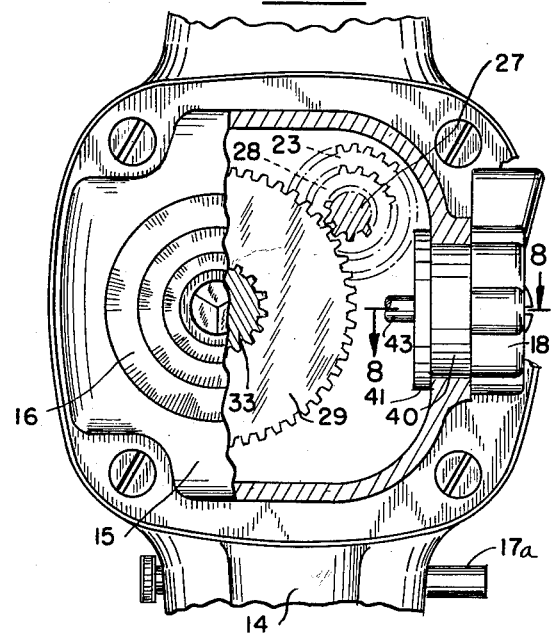
FIGURE 2 is an end elevation, taken along the lines 2—2 of FIGURE 1 and enlarged over the scale of FIGURE 1, with part of the housing broken away to show the mechanism shifted into its "low" speed position, and further showing the eccentric pin broken off for ease of illustration.
Figure 3:
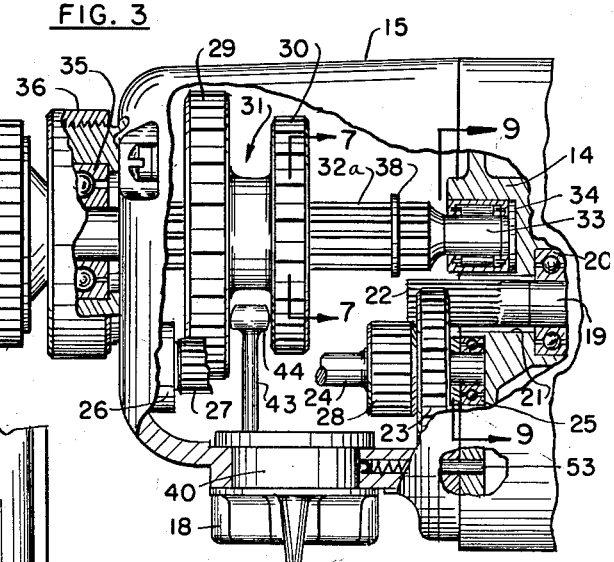
Figure 6:
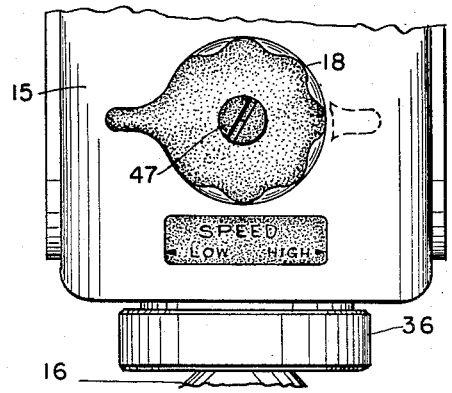

FIGURE 3 is a top plan view taken along the lines 3—3 of FIGURE 1, and enlarged over the scale of FIGURE 1, to show the chuck, the output spindle having splines formed thereon, the gear cluster slidably mounted upon the output spindle, and the means of the present invention to shift the gear cluster axially along the output spindle so as to engage one or the other of a pair of pinions formed upon an intermediate shaft, which is broken for ease of illustration, and which carries an intermediate gear that meshes with the armature pinion;

FIGURE 4 is an expanded plan view (laid out flat) to show the transmission shifted into its "low" speed position;

FIGURE 5 is an expanded plan view (corresponding substantially to that of FIGURE 3) but showing the transmission shifted into its "high" speed position;

FIGURE 6 is an elevational view taken along the lines 6—6 of FIGURE 3, showing the external appearance of the shift lever, with the alternate position of the shift lever being indicated, partially, by the broken lines;

FIGURE 7 is a detailed section view taken along the lines 7—7 of FIGURE 3, and enlarged over the scale of FIGURE 3, to show the splined interconnection between the output spindle and the axially-slidable gear cluster;

FIGURE 8 is a section view of the shift means of the present invention, taken along the lines 8—8 of FIGURE 2, and enlarged over the scale of FIGURE 2, to show the shift lever, rotatable member secured thereto, the eccentric pin carried by the rotatable member, the spherical roller carried on the end of the eccentric pin, and the axial clearances between the spherical roller and the adjacent inner parallel faces of the gears forming the gear cluster;

FIGURE 9 is a section view taken along the lines 9—9 of FIGURE 3, looking rearwardly into the gear case cover, showing the relative positions of the output spindle, intermediate shaft, and armature shaft, and further showing the means for journaling the output spindle and the intermediate spindle in the gear case cover; and FIGURE 10 is an exploded view, corresponding substantially to FIGURE 8, and showing the shift lever, the rotatable member journaled within a bore in the gear case, the detent means operative between the gear case and the rotatable member, the eccentric pin carried by the rotatable member, and the spherical roller carried on the end of the eccentric pin.

General Structure of the Tool

With reference to FIGURE 1, there is illustrated a portable electric drill 10 with which the teachings of the present invention may find more particular utility. The drill 10 is the subject of the co-pending Riley et al. application Ser. No. 177,316, filed March 5, 1962, entitled "Heavy-Duty Industrial-Type Cordless Electric Drill," and assigned to the same assignee as that of the present invention; however, it will be appreciated that the techniques of the present invention, relating to the two-speed transmission, are equally applicable to a wide variety of portable power tools and devices. With this in mind, the drill 10 comprises a generally-cylindrical motor housing 11, a pair of side handles 12a and 12b within which slide-out battery packs (not shown) may be disposed, an end handle 12, a gear case cover 14 secured forwardly of the motor housing 11, a gear case 15 secured forwardly of the gear case cover 14, a conventional chuck 16, a manually-manipulatable trigger switch 17 having a trigger lock 17a (see FIGURE 2), and a shift lever 18, the latter being part of the shift means of the present invention.

Structure of the Transmission

With reference to FIGURES 2, 3, 4, 5, 7, and 9, the two-speed transmission of the present invention may now be more particularly described. The motor housing 11 contains an electric motor (not shown) which includes an armature shaft 19. The armature shaft 19 is journaled in a ball bearing 20, which is retained within the gear case cover 14. The armature shaft 19 (see FIGURE 3) projects through an opening 21 in the gear case cover 14 to protrude within the gear case 15, and a pinion 22 is formed on the end of the armature shaft 20. The pinion 22 engages an intermediate gear 23, which is carried on an intermediate shaft 24. The intermediate shaft 24 is journaled rearwardly in a ball bearing 25 and forwardly in a ball bearing 26. Bearing 25 is retained within the gear case cover 14, while bearing 26 is retained within the gear case 15. The intermediate shaft 24 has a pair of spaced-apart different-sized pinions 27 and 28 formed thereon. The pinions 27 and 28 are adapted to engage respective gears 29 and 30 which form part of a gear cluster 31. The gear cluster 31 has internal longitudinal splines 32, see FIGURE 7, which are adapted to engage corresponding external splines 32a formed on the output spindle 33. Consequently, the gear cluster 31 is axially slidable along the output spindle 33, and moreover, the gear cluster 31 and the output spindle 33 rotate in unison. The output spindle 33 is journaled rearwardly in a roller bearing 34 and forwardly in a ball bearing 35; bearing 34 is retained within the gear case cover 14, while bearing 35 is retained within the gear case 15 by means of a threaded bearing cap 36.

With particular reference to FIGURE 4, the degree of axial sliding movement of the gear cluster 31 with respect to the spindle 33 is limited (forwardly) by means of a shoulder 37 formed on the spindle 33 and (rearwardly) by means of a snap ring 38 which is carried by the spindle 33. The spindle 33, see FIGURE 3, protrudes forwardly of the gear case 15; and the end of the spindle 33, as at 33a in FIGURE 4, is suitably threaded to engage the conventional chuck 16. Moreover, the respective axes of the armature shaft 20, intermediate shaft 24, and output spindle 33 are all parallel, but offset, with respect to each other, as is shown in FIGURE 9.

With reference again to FIGURES 3, 4, and 5, and with further reference to FIGURES 8 and 10, a bore 39 is formed in the side wall of the gear case 15, and a rotatable member 40 is journaled in the bore 39. The rotatable member 40 has a collar 41, which is received flush against the wall of the gear case 15. Moreover, the rotatable member 40 has an eccentric bore 42, and an eccentric pin 43 is press-fitted within the bore 42. The axis of the rotatable member 40 is transverse to the axis of the output spindle 33, and the rotatable member 40 (as shown more particularly in FIGURE 2) is located on the side of the armature shaft 20 which is opposite from the spindle 33. A spherical roller 44 is carried on the end of the eccentric pin 43 and is disposed intermediate the gears 29 and 30 of the slidable gear cluster 31; preferably, the roller 44 is formed as a spherical roller, and is press-fitted to the pin 43, although it will be appreciated that the roller 44, if desired, could be formed integrally with the pin 43 or else could be carried by the pin 43 in a suitable manner.

With particular reference to FIGURE 8, the spherical roller 44 has an axial clearance with respect to each of the adjacent inner parallel faces 45 and 46 of the gears 29 and 30, respectively. Moreover, the shift lever 18 is secured to the rotatable member 40 by means of a screw 47, which passes through the shift lever 18 (or equivalent shift member) and is received within a threaded bore 48 formed within the rotatable member 40. Also, the shift lever 18 has an eccentric pocket 49 within which the end of the eccentric pin 43 (opposite from the roller 44) is loosely received.

The Detent Mechanism

With reference again to FIGURES 8 and 10, the rotatable member 40 has a pair of external pockets 50 formed thereon. The pockets 50 are oppositely disposed from one another and are adapted to cooperate with a ball detent 51. The detent 51 is backed by a spring 52 and a loose-fitting pin 53, all of which are disposed within a bore 54 formed in the wall of the gear case 15. Consequently, the movement of the rotatable member 40 and the shift lever 18 will be provided with a "snap action" from one position to another. Moreover, as shown in FIGURE 3, the pin 53 serves as a locating dowel to properly align the gear case 15 with respect to the motor housing 11.

The shift lever 18 and the rotatable member 40 are adapted to rotate, in unison, from one position to another (or alternate) position. One of the positions of the rotatable member 40 corresponds to the "low" speed position of the two-speed transmission, see FIGURE 4, whereas the other position of the rotatable member 40 corresponds to the "high" speed position, as shown in FIGURE 5.

Operation of the Present Invention

With reference again to FIGURE 4, the gear 29 (of the gear cluster 31) is in engagement with the pinion 27 carried by the intermediate shaft 24. This is the "low" speed position of the mechanism. The drive is from armature pinion 22 to the intermediate gear 23, intermediate shaft 24, pinion 27, and gear 29 to output spindle 33. When it is desired to shift into the "high" speed position, the shift lever 18 and the rotatable member 40 are rotated through an angle of approximately 180 degrees such that the eccentric pin 43 is moved approximately 180 degrees to its opposite or alternate position; and the spherical roller 44, which is carried by the eccentric pin 43, temporarily engages the respective inner face 46 of gear 30 to axially slide the gear cluster 31 along the spindle 33. Thereafter, and as shown more particularly in FIGURE 5, the other gear 30 of the gear cluster 31 engages its respective pinion 28 which is formed on the intermediate shaft 24. The drive is now from the armature pinion 22, through the intermediate gear 23, intermediate shaft 24, pinion 28, and gear 30 to the output spindle 33.

Obviously, many modifications may be made without departing from the basic spirit of the present invention; and accordingly, within the scope of the appended claim, the invention may be practiced other than has been specifically described.

We claim:

In a power-operated device having a housing including a two-speed transmission housed therein, wherein a gear cluster including a pair of spaced-apart gears of different size are slidably mounted upon a spindle and are coupled thereto for rotation in unison, and wherein the gears have respective inner faces parallel to each other, that improvement in shifting the gear cluster axially along the spindle, which comprises:

(a) a rotatable disc-shaped member journaled in a bore in said housing and having a collar portion seated against the inner surface of said housing adjacent said bore;

(b) said rotatable member having an axis of rotation which is transverse to the spindle;

(c) said rotatable member further having a pair of diametrically-opposite external pockets formed thereon;

(d) a spring-loaded detent carried by said housing radially of said bore and adapted to be received within a respective one of said pockets;

(e) a manually-manipulatable externally-accessible shift member secured to said rotatable member for rotation in unison;

(f) an eccentric pin carried by said rotatable member and disposed between the respective inner faces of the gears; and (g) a spherical roller carried on the end of said pin and having an axial clearance with respect to the respective inner faces of the gears, whereby said rotatable member may be rotated through an angle, and whereby said spherical roller may engage a respective one of the inner faces of the gears, thereby sliding the gear cluster axially along the spindle.

References Cited in the file of this patent

UNITED STATES PATENTS

| | | |
|---|---|---|
| 1,581,927 | Kollock | Apr. 20, 1926 |
| 2,161,070 | McDonough | June 6, 1939 |
| 2,220,197 | Ariens | Nov. 5, 1940 |
| 2,237,530 | Olley | Apr. 8, 1941 |
| 2,911,841 | Miller | Nov. 10, 1959 |